(12) United States Patent
Li et al.

(10) Patent No.: US 11,531,234 B2
(45) Date of Patent: Dec. 20, 2022

(54) DISPLAY PANEL AND DISPLAY DEVICE

(71) Applicant: BOE TECHNOLOGY GROUP CO., LTD., Beijing (CN)

(72) Inventors: Hui Li, Beijing (CN); Hongfei Cheng, Beijing (CN); Pan Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 575 days.

(21) Appl. No.: 16/337,102

(22) PCT Filed: Sep. 19, 2018

(86) PCT No.: PCT/CN2018/106470
§ 371 (c)(1),
(2) Date: Mar. 27, 2019

(87) PCT Pub. No.: WO2019/114355
PCT Pub. Date: Jun. 20, 2019

(65) Prior Publication Data
US 2021/0325713 A1    Oct. 21, 2021

(30) Foreign Application Priority Data
Dec. 15, 2017 (CN) .......................... 201721757567.9

(51) Int. Cl.
*G02F 1/1339* (2006.01)

(52) U.S. Cl.
CPC ................ *G02F 1/13394* (2013.01)

(58) Field of Classification Search
CPC ........... G02F 1/133388; G02F 1/13394; G02F 1/1339; G02F 1/0107; G02F 1/13396;
(Continued)

(56) References Cited

U.S. PATENT DOCUMENTS

2008/0158496 A1* 7/2008 Kim .................... G02F 1/13394
349/151
2010/0085519 A1    4/2010 Liao
(Continued)

FOREIGN PATENT DOCUMENTS

CN        102540580 A       7/2012
CN        103926759 A       7/2014
(Continued)

OTHER PUBLICATIONS

International Search Report dated Nov. 27, 2018 corresponding to application No. PCT/CN2018/106470.
(Continued)

*Primary Examiner* — Mariam Qureshi
(74) *Attorney, Agent, or Firm* — Nath, Goldberg & Meyer; Joshua B. Goldberg

(57) ABSTRACT

The present disclosure provides a display panel and a display device. The display panel includes: a first substrate; a second substrate in a superposed arrangement with the first substrate; and an auxiliary retaining wall located between the first and second substrates in an edge area of a facing portion of the first and second substrates. The auxiliary retaining wall includes a first retaining wall having a first sub-portion and a second sub-portion disposed opposite to each other, the second substrate comprises a bonding area outside of and adjoined by the facing portion, and the first and second sub-portions are located in areas corresponding to two opposite edges adjacent to an edge where the bonding area is located, respectively.

11 Claims, 3 Drawing Sheets

(58) Field of Classification Search
CPC ........ H01J 9/242; H01J 11/36; H01J 2211/36; H01J 2217/49271
See application file for complete search history.

(56) References Cited

U.S. PATENT DOCUMENTS

| | | | |
|---|---|---|---|
| 2017/0176788 A1* | 6/2017 | Fukuoka | G02F 1/1339 |
| 2017/0176802 A1 | 6/2017 | Higano et al. | |
| 2018/0053810 A1* | 2/2018 | Jin | G06F 3/04164 |
| 2019/0137333 A1* | 5/2019 | Lim | G02F 1/13318 |

FOREIGN PATENT DOCUMENTS

| | | |
|---|---|---|
| CN | 104914628 A | 9/2015 |
| CN | 105607350 A | 5/2016 |
| CN | 106990622 A | 7/2017 |
| CN | 107180852 A | 9/2017 |
| CN | 207764525 U | 8/2018 |

OTHER PUBLICATIONS

Extended European Search Report dated Aug. 10, 2021 for application No. EP18874994.9.

\* cited by examiner

DISPLAY PANEL AND DISPLAY DEVICE

This is a National Phase Application filed under 35 U.S.C. 371 as a national stage of PCT/CN2018/106470, filed Sep. 19, 2018, an application which claims priority from Chinese Patent Application No. 201721757567.9 filed with the Chinese Intellectual Property Office on Dec. 15, 2017, the disclosure of each of which is incorporated herein by reference in its entirety.

TECHNICAL FIELD

The present disclosure relates to the technical field of display apparatus, and particularly relates to a display panel and a display device.

BACKGROUND

Existing liquid crystal display panels include a color filter substrate, an array substrate, and a liquid crystal layer therebetween. A thickness of the liquid crystal layer (i.e., cell thickness), which has a significant influence on the structure and display uniformity of the liquid crystal panel, is mainly controlled by a spacer between the array substrate and the color filter substrate.

Currently, in order to maintain uniformity of the cell thickness in a display area and a peripheral area of the display panel, support members are typically symmetrically disposed centering on a center of the substrate. However, due to the material, the support member will always precipitate impurity ions which, after entering the display area, are prone to cause image sticking and reduce the display effect. Leads in a bonding area may generate an electric field. Under an action of the electric field, the support member is more likely to precipitate impurity ions that are easier to be attracted to the display area of the liquid crystal display panel, resulting in even worse image sticking.

Therefore, there is an urgent need for a display panel and a display device that can avoid or reduce the occurrence of image sticking in the display area.

SUMMARY

The present disclosure provides a display panel and a display device.

According to an aspect of the disclosure, there is provided a display panel, comprising:
 a first substrate;
 a second substrate in a superposed arrangement with the first substrate; and
 an auxiliary retaining wall located between the first and second substrates in an edge area of a facing portion of the first and second substrates,
 wherein the auxiliary retaining wall includes a first retaining wall having a first sub-portion and a second sub-portion disposed opposite to each other, the second substrate comprises a bonding area outside of and adjoined by the facing portion, and the first and second sub-portions are located in areas corresponding to two opposite edges adjacent to an edge of the facing portion where the bonding area is located, respectively.

In some embodiments, the first retaining wall further includes a third sub-portion located in an area corresponding to an edge of the facing portion opposite the edge where the bonding area is located, and the first, third and second sub-portions are sequentially connected to each other to form a shape in which one side of a rectangle is open.

In some embodiments, the auxiliary retaining wall further includes a second retaining wall located at a side of the first retaining wall adjacent to a central display area of the facing portion.

In some embodiments, the second retaining wall is disposed in parallel with the first retaining wall.

In some embodiments, a height of the first retaining wall is greater than or equal to a height of the second retaining wall.

In some embodiments, the auxiliary retaining wall further includes a third retaining wall located on a side of the facing portion adjacent to the bonding area.

In some embodiments, a first gap is present in a direction parallel to the third retaining wall between an end of the third retaining wall adjacent to leads in the bonding area and an outermost lead in the bonding area.

In some embodiments, the first gap is less than or equal to 20 μm.

In some embodiments, a second gap is present in a direction perpendicular to the third retaining wall between an orthographic projection of the third retaining wall on the second substrate and an extension line of an edge of the bonding area adjacent to the facing portion.

In some embodiments, the second gap is greater than or equal to 5 μm.

In some embodiments, the third retaining wall is in the form of a straight line or a discontinuous line.

In some embodiments, a height of the third retaining wall is greater than or equal to the height of the second retaining wall.

In some embodiments, the first sub-portion and the second sub-portion are not parallel to each other.

In some embodiments, the auxiliary retaining wall is disposed on the first substrate or the second substrate.

According to another aspect of the present disclosure, there is provided a display device including the above display panel.

DETAILED DESCRIPTION

To improve understanding of the technical solution of the present disclosure for those skilled in the art, the present disclosure will now be described in detail in conjunction with accompanying drawings and exemplary embodiments.

First Exemplary Embodiment

Figure 1:
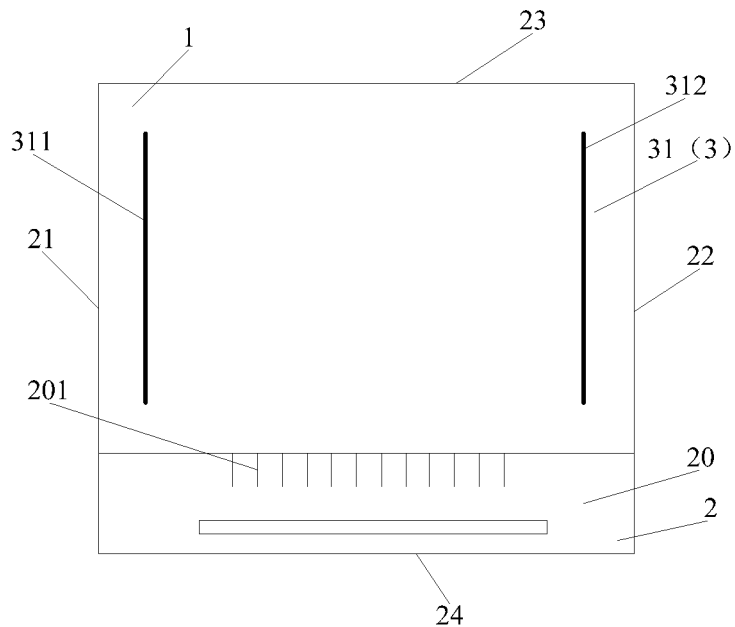
FIG. 1 is a plan view showing a display panel according to the first exemplary embodiment of the present disclosure.

As shown in FIG. 1, the first exemplary embodiment of the present disclosure provides a display panel including a first substrate 1, a second substrate 2, and an auxiliary retaining wall 3. The first substrate 1 and the second substrate 2 are superposed. The auxiliary retaining wall 3 is located between the first substrate 1 and the second substrate 2 in a peripheral area of the display panel, that is, in an edge area of a facing portion of the first substrate 1 and the second substrate 2.

In the present exemplary embodiment, the first substrate 1 is a color filter substrate, and the second substrate 2 is an array substrate. As shown in FIG. 1, the first substrate 1, the second substrate 2, and the display panel are each rectangular. The second substrate 2 includes a bonding area 20 located outside of and adjoined by the facing portion of the first substrate 1 and the second substrate 2. A long edge of an end of the second substrate 2 where the bonding area 20 is located is a fourth edge 24 of the display panel. Two opposite edges adjacent to the fourth edge 24 of the display panel are a first edge 21 and a second edge 22 of the display panel, and an edge opposite the fourth edge 24 of the display panel is a third edge 23 of the display panel.

The auxiliary retaining wall 3 includes a first retaining wall 31 disposed along the first edge 21 and the second edge 22 of the display panel. That is, in the present exemplary embodiment, the first retaining wall 31 includes a first sub-portion 311 and a second sub-portion 312 disposed opposite to each other. The first sub-portion 311 is adjacent and parallel to the first edge 21 of the display panel, while the second sub-portion 312 is adjacent and parallel to the second edge 22 of the display panel, that is, the first sub-portion 311 and the second sub-portion 312 are parallel to each other. More specifically, the first sub-portion 311 and the second sub-portion 312 are respectively located in areas corresponding to the first edge 21 and the second edge 22 of the facing portion. It should be understood that according to the actual application of the display panel, the first sub-portion 311 and the second sub-portion 312 may be non-parallel to facilitate diversified designs of the display panel. For example, when the display panel has a triangle shape, the first sub-portion 311 and the second sub-portion 312 may intersect.

The auxiliary retaining wall 3 may be disposed on the first substrate 1 or on the second substrate 2.

It should be noted that a plurality of leads 201 are disposed in the bonding area 20, each of which is located at a position (i.e., an intermediate position) of the bonding area 20 corresponding to the display area (at the center of the facing portion or the center of the display panel). Since the first retaining wall 31 is located in the peripheral area of the display panel, the first retaining wall 31 has a certain distance from an outermost lead 201 so that the first retaining wall 31 may avoid the leads 201 in the bonding area 20.

By means of the auxiliary retaining wall 3 including the first retaining wall 31 between the first substrate 1 and the second substrate 2 (the first retaining wall 31 disposed along two opposite edges 21 and 22 of the display panel adjacent to the edge 24 where the bonding area 20 is located, or the first sub-portion 311 and the second sub-portion 312 respectively disposed in areas corresponding to the first edge 21 and the second edge 22 of the facing portion), the display panel provided in the present exemplary embodiment enables the auxiliary retaining wall 3 to avoid leads in the bonding area 20, thereby reducing the number of impurity ions precipitated by the auxiliary retaining wall 3 in the display area attracted by the electric field formed by the leads in the bonding area 20, and thus solving the problem of image sticking and ensuring the display effect of the display panel.

Second Exemplary Embodiment

The present exemplary embodiment provides a display panel which differs from the display panel of the first exemplary embodiment in that: the first retaining wall 31 has a different distribution pattern.

Figure 2:
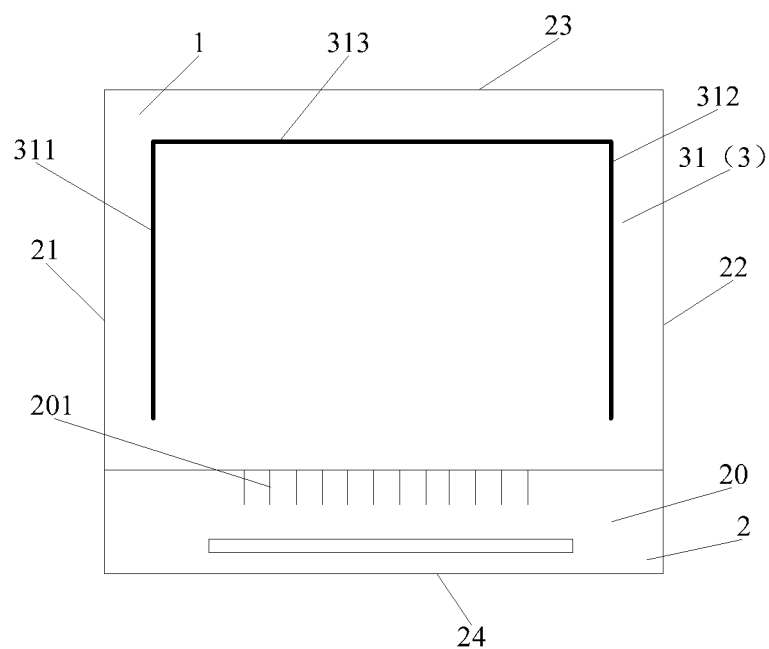
FIG. 2 is a plan view showing a display panel according to the second exemplary embodiment of the present disclosure.

Specifically, as shown in FIG. 2, in the second exemplary embodiment, the first retaining wall 31 has a shape in which one side of a rectangle is open. More specifically, the first retaining wall 31 further includes a third sub-portion 313 located in an area corresponding to the third edge 23 of the facing portion opposite the edge 24 where the bonding area 20 is located, or disposed along the third edge 23 of the display panel. That is, the first retaining wall 31 includes three sub-portions 311, 312, 313 that are disposed along the first edge 21, the third edge 23 and the second edge 22 of the display panel respectively and connected to each other to form a shape in which one side of a rectangle is open toward the bonding area 20.

Other structures of the display panel of the second exemplary embodiment are the same as those of the first exemplary embodiment, and are not repeated herein.

Third Exemplary Embodiment

The present exemplary embodiment provides a display panel which differs from the display panel of the second exemplary embodiment in that: the auxiliary retaining wall includes not only the first retaining wall but also a second retaining wall.

Figure 3:
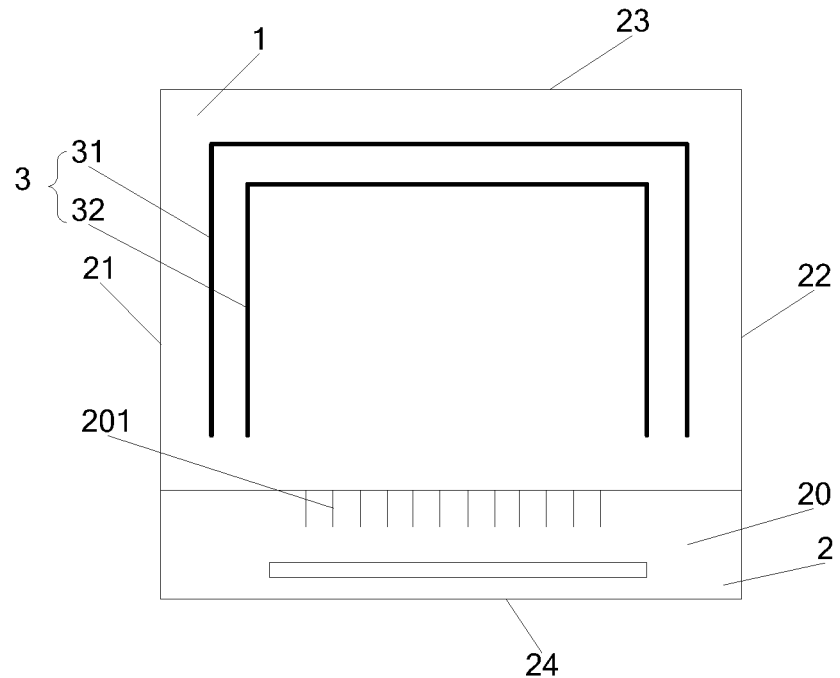
FIG. 3 is a plan view showing a display panel according to the third exemplary embodiment of the present disclosure.

As shown in FIG. 3, in addition to the first retaining wall 31, the auxiliary retaining wall 3 further includes a second retaining wall 32 located at a side of the first retaining wall 31 adjacent to the display area of the display panel (at the center of the facing portion), that is, the first retaining wall 31 is closer to the edges of the display panel with respect to the second retaining wall 32 and is located outside of the second retaining wall 32.

In the present exemplary embodiment, the second retaining wall 32 is disposed in parallel with the first retaining wall 31. That is, the second retaining wall 32 has the same distribution pattern as the first retaining wall 31. Namely, the second retaining wall 32 also includes three sub-portions that are disposed along the first edge 21, the third edge 23 and the second edge 22 of the display panel respectively and connected to each other to form a shape in which one side of a rectangle is open toward the bonding area 20.

It should be noted that although the present exemplary embodiment is illustrated with the example that the first retaining wall 31 and the second retaining wall 32 both have a shape in which one side of a rectangle is open, when the first retaining wall 31 has the structure as shown in the first exemplary embodiment, i.e., when the first retaining wall 31 is disposed along the first edge 21 and the second edge 22 of the display panel, the second retaining wall 32 is also disposed along the first edge 21 and the second edge 22 of the display panel. Apparently, those skilled in the art will appreciate that in this case, the second retaining wall 32 may also have a shape in which one side of a rectangle is open, that is, disposed along the first edge 21, the third edge 23, and the second edge 22 of the display panel.

During the cell assembly process of the first substrate 1 and the second substrate 2, a pressure is applied to the display panel, causing clips and frames in the peripheral area of the display panel to be damaged due to excess stress. In order to solve this problem, a height of the first retaining wall 31 may be set to be greater than a height of the second retaining wall 32 so that the first retaining wall 31 may share part of the pressure to avoid damage to the clips and frames. It should be noted that the height of the first retaining wall 31 may also be equal to the height of the second retaining wall 32 so that the stability and uniformity in cell thickness of the display panel can be improved.

Other structures of the display panel of the third exemplary embodiment are the same as those of the second exemplary embodiment, and are not repeated herein.

Fourth Exemplary Embodiment

The present exemplary embodiment provides a display panel which differs from the display panel of the third exemplary embodiment in that: the auxiliary retaining wall includes not only the first retaining wall and the second retaining wall, but also a third retaining wall.

Figure 4:
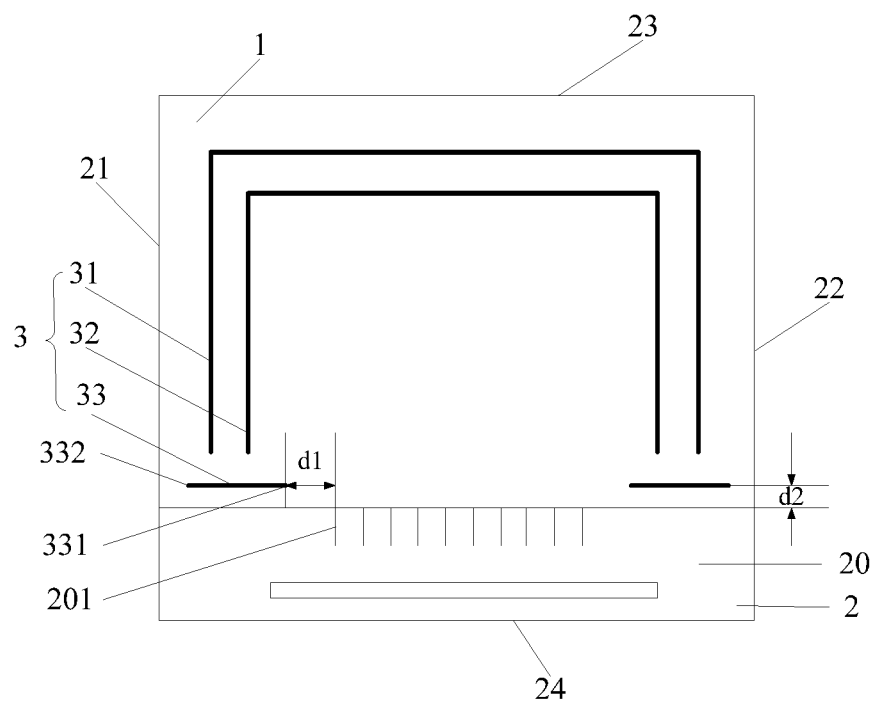
FIG. 4 is a plan view showing a display panel according to the fourth exemplary embodiment of the present disclosure.

As shown in FIG. 4, in addition to the first retaining wall 31 and the second retaining wall 32, the auxiliary retaining wall 3 further includes a third retaining wall 33 disposed along the edge of the display panel where the bonding area 20 is located (i.e., the fourth edge 24) and located on a side of the facing portion adjacent to the bonding area 20.

In order to prevent the electric field generated by the leads 201 in the bonding area 20 from affecting the third retaining wall 33, in the present exemplary embodiment, a first gap d1 is present in a direction parallel to the third retaining wall 33 between a first end 331 of the third retaining wall 33 adjacent to the leads 201 in the bonding area 20 and an outermost lead 201 in the bonding area 20. That is, the third retaining wall 33 does not extend to the area where the leads 201 are located, but is located outside the leads 201. In the present exemplary embodiment, d1 is less than or equal to 20 μm. The other end of the third retaining wall 33 (i.e., the second end 332) corresponds to the end of the first retaining wall 31.

Further, a second gap d2 is present in a direction perpendicular to the third retaining wall 33 between an orthographic projection of the third retaining wall 33 on the second substrate 2 and an extension line of an edge of the bonding area 20 adjacent to the display area or the facing portion. In the present exemplary embodiment, d2 is greater than or equal to 5 μm.

In the present exemplary embodiment, the third retaining wall 33 is in the form of a straight line, i.e., the third retaining wall 33 has a continuous linear structure.

A height of the third retaining wall 33 is greater than or equal to the height of the second retaining wall 32, and the relation between the height of the third retaining wall 33 and the height of the first retaining wall 31 is not limited herein. In the present exemplary embodiment, the height of the third retaining wall 33 is equal to the height of the first retaining wall 31.

In the present exemplary embodiment, the first retaining wall 31, the second retaining wall 32, and the third retaining wall 33 may have the same height so as to improve the stability and uniformity in cell thickness. Alternatively, the height of the first retaining wall 31 is greater than the height of the second retaining wall 32, and the height of the third retaining wall 33 is greater than the height of the second retaining wall 32, so as to reduce the pressure on the clips and the frames in the peripheral area.

Other structures of the display panel of the fourth exemplary embodiment are the same as those of the third exemplary embodiment, and are not repeated herein.

Fifth Exemplary Embodiment

The present exemplary embodiment provides a display panel which differs from the display panel of the fourth exemplary embodiment in that: the third retaining wall 33 has a different structure.

Figure 5:
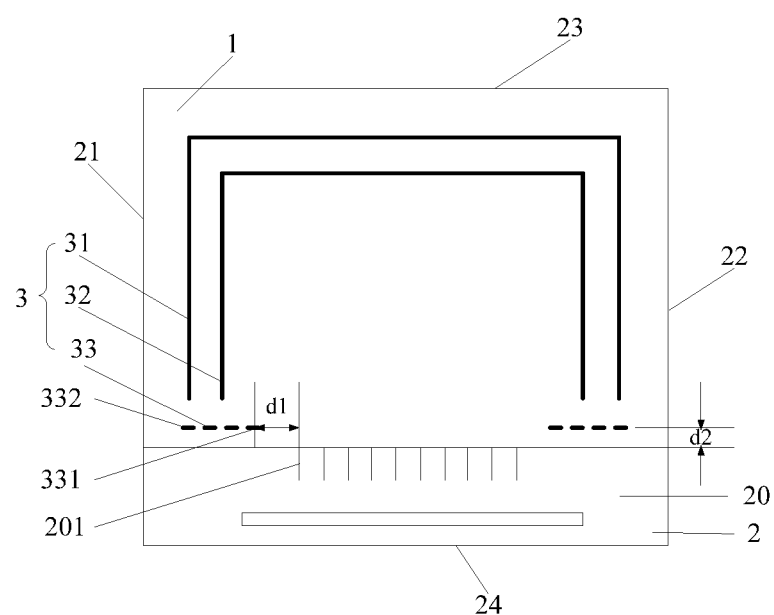
FIG. 5 is a plan view showing a display panel according to the fifth exemplary embodiment of the present disclosure.

As shown in FIG. 5, in the fifth exemplary embodiment, the third retaining wall 33 has a discontinuous linear structure, that is, the third retaining wall 33 has slits. Compared with the third retaining wall 33 in the form of a straight line in the fourth exemplary embodiment, the discontinuous linear structure may facilitate discharge of gas within the liquid crystal layer via the slits of the third retaining wall 33 during the cell assembly process of the first substrate 1 and the second substrate 2, thereby preventing gas from remaining inside of the display panel and affecting the display effect.

Other structures of the display panel of the fifth exemplary embodiment are the same as those of the fourth exemplary embodiment, and are not repeated herein.

Sixth Exemplary Embodiment

The present exemplary embodiment provides a display device including the display panel as described in any of the first to fifth exemplary embodiments. The specific structure of the display panel will not be repeated herein.

The display device provided in the present exemplary embodiment includes a display panel. By means of the auxiliary retaining wall 3 including the first retaining wall 31 between the first substrate 1 and the second substrate 2 (the first retaining wall 31 disposed along two opposite edges 21 and 22 of the display panel adjacent to the edge 24 where the bonding area 20 is located, or the first sub-portion 311 and the second sub-portion 312 respectively disposed in areas corresponding to the first edge 21 and the second edge 22 of the facing portion), the display panel enables the auxiliary retaining wall 3 to avoid leads in the bonding area 20, thereby reducing the number of impurity ions precipitated by the auxiliary retaining wall 3 in the display area attracted by the electric field formed by the leads in the bonding area 20, and thus solving the problem of image sticking and ensuring the display effect of the display panel.

It should be understood that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:
1. A display panel, comprising:
a first substrate;
a second substrate in a superposed arrangement with the first substrate; and
an auxiliary retaining wall located between the first and second substrates only in an edge area of a facing portion of the first and second substrates,
wherein the auxiliary retaining wall includes a first retaining wall having a first sub-portion and a second sub-portion disposed opposite to each other, the second substrate comprises a bonding area outside of and adjoined by the facing portion, and the first and second sub-portions are located in areas corresponding to two opposite edges adjacent to an edge of the facing portion where the bonding area is located, respectively,
wherein the facing portion of the first and second substrates is the entire portion of the first substrate and the second substrate facing each other,
wherein a plurality of leads are disposed in the bonding area, wherein the auxiliary retaining wall further includes a third retaining wall located on a side of the facing portion adjacent to the bonding area, the third retaining wall does not extend to the area where the leads are located, wherein a first gap is present in a direction parallel to the third retaining wall between an end of the third retaining wall adjacent to leads in the bonding area and an outermost lead in the bonding area, and wherein the first gap is less than or equal to 20 µm, wherein a second gap is present in a direction perpendicular to the third retaining wall between an orthographic projection of the third retaining wall on the second substrate and an extension line of an edge of the bonding area adjacent to the facing portion, wherein the second gap is greater than or equal to 5 µm, and wherein the first retaining wall further includes a third sub-portion located in an area corresponding to an edge of the facing portion opposite the edge where the bonding area is located, and the first, third and second sub-portions are sequentially connected to each other to form a shape in which one side of a rectangle is open.

2. The display panel according to claim 1, wherein the auxiliary retaining wall further includes a second retaining wall located at a side of the first retaining wall adjacent to a central display area of the facing portion.

3. The display panel according to claim 2, wherein the second retaining wall is disposed in parallel with the first retaining wall.

4. The display panel according to claim 3, wherein a height of the first retaining wall is greater than or equal to a height of the second retaining wall.

5. The display panel according to claim 2, wherein a height of the third retaining wall is greater than or equal to the height of the second retaining wall.

6. The display panel according to claim 1, wherein the third retaining wall is in the form of a straight line.

7. The display panel according to claim 1, wherein the third retaining wall is in the form of a discontinuous line.

8. The display panel according to claim 1, wherein the first sub-portion and the second sub-portion are not parallel to each other.

9. The display panel according to claim 1, wherein the auxiliary retaining wall is disposed on the first substrate.

10. The display panel according to claim 1, wherein the auxiliary retaining wall is disposed on the second substrate.

11. A display device comprising the display panel according to claim 1.

* * * * *